(12) United States Patent
Katsurahira et al.

(10) Patent No.: US 12,008,206 B2
(45) Date of Patent: Jun. 11, 2024

(54) POSITION DETECTION DEVICE, AND POSITION DETECTION METHOD BASED ON ELECTROMAGNETIC INDUCTIVE COUPLING AND CAPACITIVE COUPLING

(71) Applicant: Wacom Co., Ltd., Saitama (JP)

(72) Inventors: Yuji Katsurahira, Saitama (JP); Hideyuki Hara, Saitama (JP)

(73) Assignee: Wacom Co., Ltd., Saitama (JP)

( * ) Notice: Subject to any disclaimer, the term of this patent is extended or adjusted under 35 U.S.C. 154(b) by 0 days.

(21) Appl. No.: 18/194,453

(22) Filed: Mar. 31, 2023

(65) Prior Publication Data

US 2023/0236701 A1 Jul. 27, 2023

Related U.S. Application Data

(63) Continuation of application No. 17/559,954, filed on Dec. 22, 2021, now Pat. No. 11,644,936, which is a
(Continued)

(30) Foreign Application Priority Data

Feb. 13, 2018 (JP) ................. 2018-022683

(51) Int. Cl.
*G06F 3/046* (2006.01)
*G06F 3/041* (2006.01)
*G06F 3/044* (2006.01)

(52) U.S. Cl.
CPC .......... *G06F 3/046* (2013.01); *G06F 3/04164* (2019.05); *G06F 3/0446* (2019.05); *G06F 3/0447* (2019.05); *G06F 2203/04106* (2013.01)

(58) Field of Classification Search
CPC .... G06F 3/046; G06F 3/0446; G06F 3/04164; G06F 3/0447; G06F 2203/04106
See application file for complete search history.

(56) References Cited

U.S. PATENT DOCUMENTS 5,434,372 A 7/1995 Lin
5,670,754 A 9/1997 Matsushima
(Continued)

FOREIGN PATENT DOCUMENTS

EP 2028585 A1 2/2009
EP 2600230 A2 6/2013
(Continued)

OTHER PUBLICATIONS

European Office Action, dated Jun. 2, 2022, for European Patent Application No. 18906401.7. (9 pages).
(Continued)

*Primary Examiner* — Lisa S Landis
(74) *Attorney, Agent, or Firm* — Seed IP Law Group LLP

(57) ABSTRACT

A position detection device includes a position detection sensor and selection circuitry. The position detection sensor has first loop electrodes arranged in a first direction and second loop electrodes arranged in a second direction perpendicular to the first direction. The selection circuitry is coupled to the first loop electrodes of the position detection sensor and, in operation, simultaneously selects two of the first loop electrodes, connects a first terminal of each of the two of the first loop electrodes to a first one of two first common terminals, and connects a second terminal of each of the two of first loop electrodes to a second one of the two first common terminals. The two of the first loop electrodes change sequentially over time from a first two of the plurality of first loop electrodes to a last two of the plurality of first loop electrodes.

20 Claims, 9 Drawing Sheets

Related U.S. Application Data continuation of application No. 16/986,204, filed on Aug. 5, 2020, now Pat. No. 11,249,610, which is a continuation of application No. PCT/JP2018/042223, filed on Nov. 15, 2018.

(56) References Cited

U.S. PATENT DOCUMENTS

| | | | |
|---|---|---|---|
| 2013/0106769 A1 | 5/2013 | Bakken et al. | |
| 2013/0141085 A1 | 6/2013 | Suzuki | |
| 2014/0176486 A1* | 6/2014 | Lee | G06F 3/0446 |
| | | | 345/174 |
| 2017/0108972 A1 | 4/2017 | Kurasawa et al. | |

FOREIGN PATENT DOCUMENTS

| | | |
|---|---|---|
| JP | 2014164770 A | 9/2014 |
| JP | 2015041318 A | 3/2015 |
| JP | 5702511 B1 | 4/2015 |
| JP | 5819565 B1 | 11/2015 |
| JP | 2017076352 A | 4/2017 |
| KR | 20140083634 A | 7/2014 |

OTHER PUBLICATIONS

Extended European Search Report, dated Dec. 9, 2020, for European Patent Application No. 18906401.7. (9 pages).

International Search Report, dated Jan. 22, 2019, for International Application No. PCT/JP2018/042223. (1 page).

Japanese Office Action, dated Dec. 8, 2021, for Japanese Patent Application No. 2020-500277. (8 pages) (with English translation).

Japanese Notice of Reasons for Refusal dated Jul. 19, 2023, for the corresponding Japanese Patent Application No. 2022-083482, 6 pages. (With English Translation).

Korean Office Action dated Jul. 31, 2023, for the corresponding Korean Patent Application No. 10-2020-7022421, 9 pages. (With English Translation).

\* cited by examiner

FIG.5

| | ORDER OF SELECTION FOR X-SIDE SELECTION SWITCHES | | | | | | | | | | | | | | | | | | | | | |
|---|---|---|---|---|---|---|---|---|---|---|---|---|---|---|---|---|---|---|---|---|---|---|
| X1 | 1 | 0 | 0 | 0 | 0 | 0 | 0 | 0 | 0 | 0 | · · · · · · | 0 | 0 | 0 | 0 | 0 | 0 | 0 | 0 | 0 | 0 | 0 |
| X2 | 1 | 1 | 0 | 0 | 0 | 0 | 0 | 0 | 0 | 0 | · · · · · · | 0 | 0 | 0 | 0 | 0 | 0 | 0 | 0 | 0 | 0 | 0 |
| X3 | 0 | 1 | 1 | 0 | 0 | 0 | 0 | 0 | 0 | 0 | · · · · · · | 0 | 0 | 0 | 0 | 0 | 0 | 0 | 0 | 0 | 0 | 0 |
| X4 | 0 | 0 | 1 | 1 | 0 | 0 | 0 | 0 | 0 | 0 | · · · · · · | 0 | 0 | 0 | 0 | 0 | 0 | 0 | 0 | 0 | 0 | 0 |
| X5 | 0 | 0 | 0 | 1 | 1 | 0 | 0 | 0 | 0 | 0 | · · · · · · | 0 | 0 | 0 | 0 | 0 | 0 | 0 | 0 | 0 | 0 | 0 |
| X6 | 0 | 0 | 0 | 0 | 1 | 1 | 0 | 0 | 0 | 0 | · · · · · · | 0 | 0 | 0 | 0 | 0 | 0 | 0 | 0 | 0 | 0 | 0 |
| X7 | 0 | 0 | 0 | 0 | 0 | 1 | 1 | 0 | 0 | 0 | · · · · · · | 0 | 0 | 0 | 0 | 0 | 0 | 0 | 0 | 0 | 0 | 0 |
| X8 | 0 | 0 | 0 | 0 | 0 | 0 | 1 | 1 | 0 | 0 | · · · · · · | 0 | 0 | 0 | 0 | 0 | 0 | 0 | 0 | 0 | 0 | 0 |
| X9 | 0 | 0 | 0 | 0 | 0 | 0 | 0 | 1 | 1 | 0 | · · · · · · | 0 | 0 | 0 | 0 | 0 | 0 | 0 | 0 | 0 | 0 | 0 |
| X10 | 0 | 0 | 0 | 0 | 0 | 0 | 0 | 0 | 1 | 1 | · · · · · · | 0 | 0 | 0 | 0 | 0 | 0 | 0 | 0 | 0 | 0 | 0 |
| X11 | 0 | 0 | 0 | 0 | 0 | 0 | 0 | 0 | 0 | 1 | · · · · · · | 0 | 0 | 0 | 0 | 0 | 0 | 0 | 0 | 0 | 0 | 0 |
| ⋮ | | | | | | | | | | | | | | | | | | | | | | |
| X30 | 0 | 0 | 0 | 0 | 0 | 0 | 0 | 0 | 0 | 0 | · · · · · · | 1 | 1 | 0 | 0 | 0 | 0 | 0 | 0 | 0 | 0 | 0 |
| X31 | 0 | 0 | 0 | 0 | 0 | 0 | 0 | 0 | 0 | 0 | · · · · · · | 0 | 1 | 1 | 0 | 0 | 0 | 0 | 0 | 0 | 0 | 0 |
| X32 | 0 | 0 | 0 | 0 | 0 | 0 | 0 | 0 | 0 | 0 | · · · · · · | 0 | 0 | 1 | 1 | 0 | 0 | 0 | 0 | 0 | 0 | 0 |
| X33 | 0 | 0 | 0 | 0 | 0 | 0 | 0 | 0 | 0 | 0 | · · · · · · | 0 | 0 | 0 | 1 | 1 | 0 | 0 | 0 | 0 | 0 | 0 |
| X34 | 0 | 0 | 0 | 0 | 0 | 0 | 0 | 0 | 0 | 0 | · · · · · · | 0 | 0 | 0 | 0 | 1 | 1 | 0 | 0 | 0 | 0 | 0 |
| X35 | 0 | 0 | 0 | 0 | 0 | 0 | 0 | 0 | 0 | 0 | · · · · · · | 0 | 0 | 0 | 0 | 0 | 1 | 1 | 0 | 0 | 0 | 0 |
| X36 | 0 | 0 | 0 | 0 | 0 | 0 | 0 | 0 | 0 | 0 | · · · · · · | 0 | 0 | 0 | 0 | 0 | 0 | 1 | 1 | 0 | 0 | 0 |
| X37 | 0 | 0 | 0 | 0 | 0 | 0 | 0 | 0 | 0 | 0 | · · · · · · | 0 | 0 | 0 | 0 | 0 | 0 | 0 | 1 | 1 | 0 | 0 |
| X38 | 0 | 0 | 0 | 0 | 0 | 0 | 0 | 0 | 0 | 0 | · · · · · · | 0 | 0 | 0 | 0 | 0 | 0 | 0 | 0 | 1 | 1 | 0 |
| X39 | 0 | 0 | 0 | 0 | 0 | 0 | 0 | 0 | 0 | 0 | · · · · · · | 0 | 0 | 0 | 0 | 0 | 0 | 0 | 0 | 0 | 1 | 1 |
| X40 | 0 | 0 | 0 | 0 | 0 | 0 | 0 | 0 | 0 | 0 | · · · · · · | 0 | 0 | 0 | 0 | 0 | 0 | 0 | 0 | 0 | 0 | 1 |

⟶ TIME

FIG.8

| | ORDER OF SELECTION FOR X-SIDE SELECTION SWITCHES | | | | | | | | | | | | | | | | | | | | |
|---|---|---|---|---|---|---|---|---|---|---|---|---|---|---|---|---|---|---|---|---|---|
| X1 | 1 | 0 | 0 | 0 | 0 | 0 | 0 | 0 | 0 | 0 | ····· | 0 | 0 | 0 | 0 | 0 | 0 | 0 | 0 | 0 | 0 |
| X2 | 1 | 1 | 0 | 0 | 0 | 0 | 0 | 0 | 0 | 0 | ····· | 0 | 0 | 0 | 0 | 0 | 0 | 0 | 0 | 0 | 0 |
| X3 | 1 | 1 | 1 | 0 | 0 | 0 | 0 | 0 | 0 | 0 | ····· | 0 | 0 | 0 | 0 | 0 | 0 | 0 | 0 | 0 | 0 |
| X4 | 0 | 1 | 1 | 1 | 0 | 0 | 0 | 0 | 0 | 0 | ····· | 0 | 0 | 0 | 0 | 0 | 0 | 0 | 0 | 0 | 0 |
| X5 | 0 | 0 | 1 | 1 | 1 | 0 | 0 | 0 | 0 | 0 | ····· | 0 | 0 | 0 | 0 | 0 | 0 | 0 | 0 | 0 | 0 |
| X6 | 0 | 0 | 0 | 1 | 1 | 1 | 0 | 0 | 0 | 0 | ····· | 0 | 0 | 0 | 0 | 0 | 0 | 0 | 0 | 0 | 0 |
| X7 | 0 | 0 | 0 | 0 | 1 | 1 | 1 | 0 | 0 | 0 | ····· | 0 | 0 | 0 | 0 | 0 | 0 | 0 | 0 | 0 | 0 |
| X8 | 0 | 0 | 0 | 0 | 0 | 1 | 1 | 1 | 0 | 0 | ····· | 0 | 0 | 0 | 0 | 0 | 0 | 0 | 0 | 0 | 0 |
| X9 | 0 | 0 | 0 | 0 | 0 | 0 | 1 | 1 | 1 | 0 | ····· | 0 | 0 | 0 | 0 | 0 | 0 | 0 | 0 | 0 | 0 |
| X10 | 0 | 0 | 0 | 0 | 0 | 0 | 0 | 1 | 1 | 1 | ····· | 0 | 0 | 0 | 0 | 0 | 0 | 0 | 0 | 0 | 0 |
| X11 | 0 | 0 | 0 | 0 | 0 | 0 | 0 | 0 | 1 | 1 | ····· | 0 | 0 | 0 | 0 | 0 | 0 | 0 | 0 | 0 | 0 |
| ⋮ | | | | | | | | | | | | | | | | | | | | | |
| X30 | 0 | 0 | 0 | 0 | 0 | 0 | 0 | 0 | 0 | 0 | ····· | 1 | 1 | 1 | 0 | 0 | 0 | 0 | 0 | 0 | 0 |
| X31 | 0 | 0 | 0 | 0 | 0 | 0 | 0 | 0 | 0 | 0 | ····· | 0 | 1 | 1 | 1 | 0 | 0 | 0 | 0 | 0 | 0 |
| X32 | 0 | 0 | 0 | 0 | 0 | 0 | 0 | 0 | 0 | 0 | ····· | 0 | 0 | 1 | 1 | 1 | 0 | 0 | 0 | 0 | 0 |
| X33 | 0 | 0 | 0 | 0 | 0 | 0 | 0 | 0 | 0 | 0 | ····· | 0 | 0 | 0 | 1 | 1 | 1 | 0 | 0 | 0 | 0 |
| X34 | 0 | 0 | 0 | 0 | 0 | 0 | 0 | 0 | 0 | 0 | ····· | 0 | 0 | 0 | 0 | 1 | 1 | 1 | 0 | 0 | 0 |
| X35 | 0 | 0 | 0 | 0 | 0 | 0 | 0 | 0 | 0 | 0 | ····· | 0 | 0 | 0 | 0 | 0 | 1 | 1 | 1 | 0 | 0 |
| X36 | 0 | 0 | 0 | 0 | 0 | 0 | 0 | 0 | 0 | 0 | ····· | 0 | 0 | 0 | 0 | 0 | 0 | 1 | 1 | 1 | 0 |
| X37 | 0 | 0 | 0 | 0 | 0 | 0 | 0 | 0 | 0 | 0 | ····· | 0 | 0 | 0 | 0 | 0 | 0 | 0 | 1 | 1 | 1 |
| X38 | 0 | 0 | 0 | 0 | 0 | 0 | 0 | 0 | 0 | 0 | ····· | 0 | 0 | 0 | 0 | 0 | 0 | 0 | 0 | 1 | 1 |
| X39 | 0 | 0 | 0 | 0 | 0 | 0 | 0 | 0 | 0 | 0 | ····· | 0 | 0 | 0 | 0 | 0 | 0 | 0 | 0 | 0 | 1 |
| X40 | 0 | 0 | 0 | 0 | 0 | 0 | 0 | 0 | 0 | 0 | ····· | 0 | 0 | 0 | 0 | 0 | 0 | 0 | 0 | 0 | 1 |

POSITION DETECTION DEVICE, AND POSITION DETECTION METHOD BASED ON ELECTROMAGNETIC INDUCTIVE COUPLING AND CAPACITIVE COUPLING

BACKGROUND

Technical Field

This disclosure relates to a position detection device that enables detection of a position indicated by a pointer through electromagnetic inductive coupling, and detection of a position indicated by a pointer through capacitive coupling, to be performed using a common position detection sensor.

Background Art

A position detection device is known which allows a position indicated by a stylus (an electronic pen) that supports a capacitive coupling method, as well as a position touched by a human finger, to be detected using a position detection sensor supporting the capacitive coupling method. However, this position detection device has a problem in that, if a human body, such as a finger, touches a surface of the position detection sensor when a position indicated by the stylus is to be detected, an accurate detection of the position indicated by the stylus will be difficult.

The above problem could be solved by detecting the position indicated by the stylus through a position detection sensor supporting an electromagnetic induction method, and detecting a position touched by a human finger through a position detection sensor supporting the capacitive coupling method.

However, if the position detection sensor supporting the electromagnetic induction method and the position detection sensor supporting the capacitive coupling method are separately provided in a position detection device, the structure of the position detection device will be complicated.

As such, to solve this problem, each of Patent Document 1 (Japanese Patent No. 5702511) and Patent Document 2 (Japanese Patent No. 5819565) has proposed a position detection device that allows position detection employing the electromagnetic induction method and position detection employing the capacitive coupling method to be implemented using a single common position detection sensor.

PRIOR ART DOCUMENT

Patent Documents

Patent Document 1: Japanese Patent No. 5702511
Patent Document 2: Japanese Patent No. 5819565

BRIEF SUMMARY

Technical Problems

However, in a position detection sensor of the position detection device proposed in Patent Document 1, a plurality of linear conductors (x-axis linear bodies and y-axis linear bodies) extending in directions perpendicular to each other are provided on a front surface and a rear surface of a substrate, and switch circuits are provided on both sides of the x-axis linear bodies and of the y-axis linear bodies to allow loop coils for electromagnetic inductive coupling to be formed and switching among the loop coils to be performed, and to allow switching among the x-axis linear bodies and the y-axis linear bodies to be performed for capacitive coupling. Accordingly, the structure of the position detection sensor is complicated.

Meanwhile, in a position detection sensor of the position detection device proposed in Patent Document 2, a plurality of linear conductors (x-axis linear bodies and y-axis linear bodies) extending in directions perpendicular to each other are provided on a front surface and a rear surface of a substrate, and both the x-axis linear bodies and the y-axis linear bodies are divided into linear bodies to be used in the electromagnetic induction method and linear bodies to be used in the capacitive coupling method. Accordingly, in the position detection sensor, areas that allow detection employing the electromagnetic induction method and areas that allow detection employing the capacitive coupling method exist separately, making it impossible to use the entire area of the position detection sensor for both the electromagnetic induction method and the capacitive coupling method.

An object of this disclosure is to provide a position detection device that is able to solve the above problems.

Technical Solution

To solve the aforementioned problems, a position detection device is provided which includes: a sensor having a plurality of first electrodes arranged in a first direction, and a plurality of second electrodes arranged in a second direction that crosses the first direction; and signal processing circuitry connected to the sensor, and configured to detect a position indicated by a first pointer on the sensor and a position indicated by a second pointer on the sensor, in which each of the first electrodes and the second electrodes is formed as a loop electrode, the signal processing circuitry includes selection circuitry configured to select the plurality of first electrodes and the plurality of second electrodes, and the selection circuitry is configured to select the first and second electrodes such that an induced electric current is induced in each of the first and second electrodes to enable the position indicated by the first pointer on the sensor to be detected through electromagnetic inductive coupling between the first pointer and the sensor, and select the first and second electrodes such that an induced electric current is not induced in each of the first and second electrodes to enable the position indicated by the second pointer on the sensor to be detected through capacitive coupling between the second pointer and the sensor.

On the sensor of the position detection device having the above-described structure, the plurality of first electrodes and the plurality of second electrodes are arranged as loop electrodes in the first direction and the second direction that cross each other. In addition, the loop electrodes arranged on the sensor are selected by the selection circuitry such that an induced electric current is induced in each of the loop electrodes to enable electromagnetic inductive coupling with the first pointer, enabling the position indicated by the first pointer to be detected by an electromagnetic induction method. In addition, the loop electrodes arranged on the sensor are selected by the selection circuitry such that an induced electric current is not induced in each of the loop electrodes to enable capacitive coupling with the second pointer, enabling the position indicated by the second pointer to be detected by a capacitive coupling method.

BRIEF DESCRIPTION OF THE DRAWINGS

FIG. 5 is a diagram for explaining loop electrode selection control performed by selection circuitry in the electromagnetic induction mode in a position detection device according to a first example of the second embodiment.

FIG. 8 is a diagram for explaining an operation of a position detection device according to a second example of the second embodiment in the electromagnetic induction mode.

MODES FOR CARRYING OUT THE DISCLOSURE

First Embodiment

Figure 1:
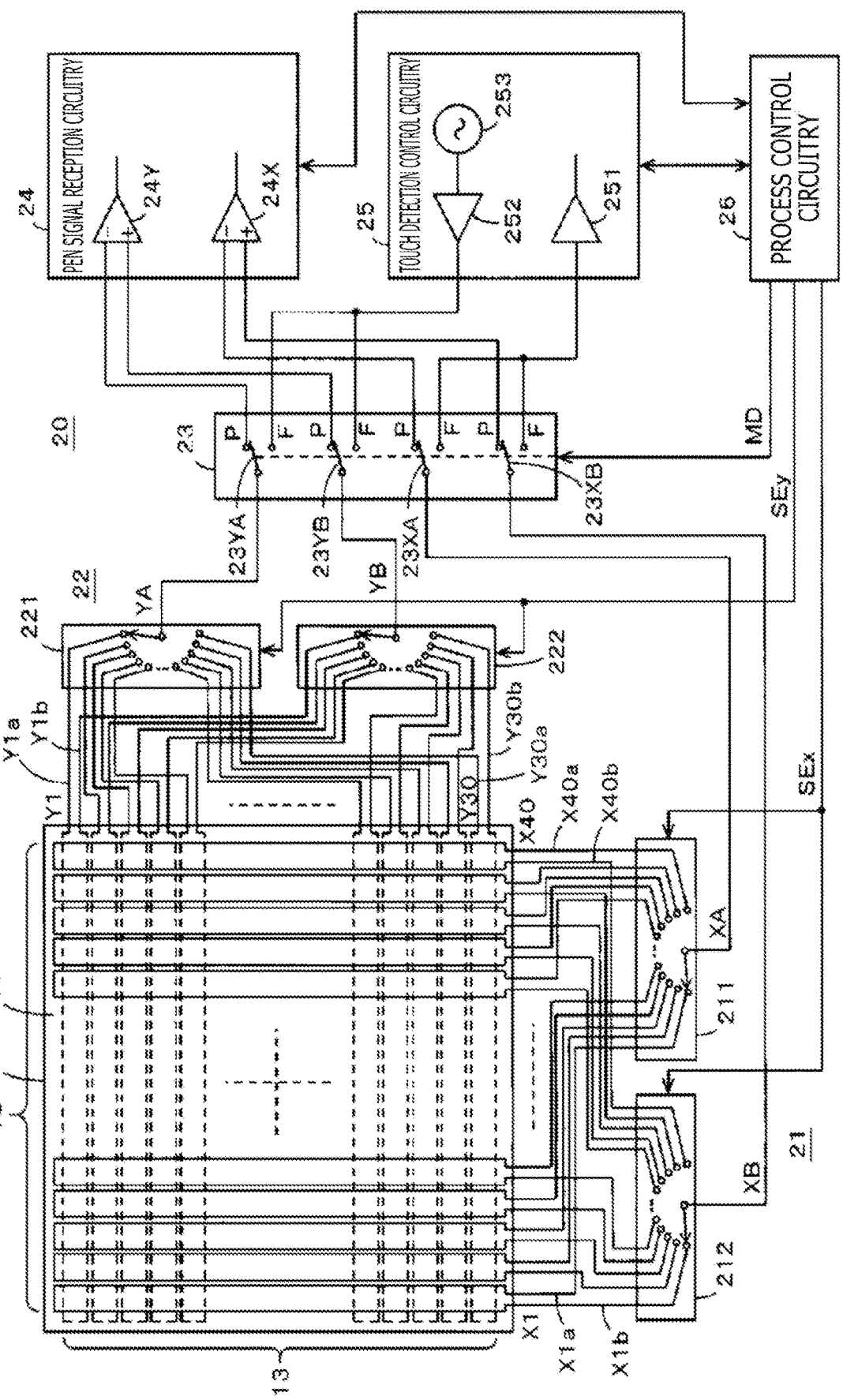
FIG. 1 is a diagram illustrating an example configuration of a position detection device according to a first embodiment of this disclosure.

FIG. 1 is a diagram illustrating an example configuration of a position detection device 1 according to a first embodiment of this disclosure. The position detection device 1 according to this embodiment allows use of an electronic pen (a stylus) as an example of a first pointer and a human finger as an example of a second pointer, and is configured to be capable of detecting coordinates (X, Y) of a position indicated by a pointer no matter which pointer is used to indicate the position.

Figure 2:
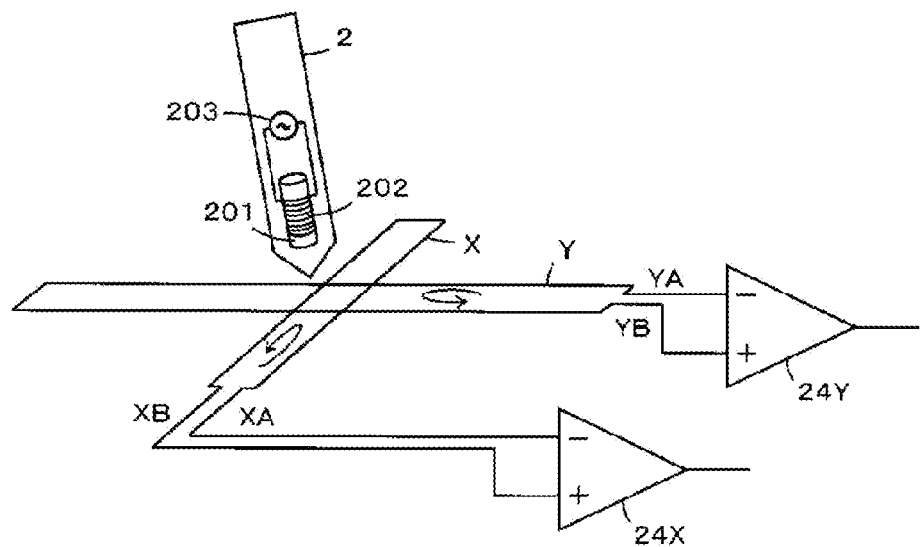
FIG. 2 is a diagram for explaining an operating state of the position detection device according to the first embodiment in an electromagnetic induction mode.

As illustrated in FIG. 2, an electronic pen 2, which is the first pointer to be detected by the position detection device according to the first embodiment, includes a coil 202 wound around a magnetic core 201, and is configured to transmit, as electromagnetic induction energy, a signal from a signal generation circuit 203 to the position detection device 1 through the coil 202 in an example described below. Note that the electronic pen 2 is provided with a battery (not illustrated) to drive the signal generation circuit 203.

As illustrated in FIG. 1, the position detection device 1 according to this embodiment includes a position detection sensor 10, and signal processing circuitry 20 connected to the position detection sensor 10. In this example, the position detection sensor 10 is a transparent sensor disposed on a display screen of a display device, such as a liquid crystal display.

Specifically, the position detection sensor 10 according to this example is configured to have a rectangular transparent substrate 11, such as a glass substrate, and loop electrode groups each of which is composed of a plurality of elongated loop electrodes arranged at regular intervals so as not to overlap with one another on the transparent substrate 11 and formed by metal mesh electrodes made up of thin lines of ITO (Indium Tin Oxide), silver, copper, or the like, with the horizontal direction of the transparent substrate 11 defined as an x-axis direction (an example of a first direction), and the vertical direction of the transparent substrate 11, which is perpendicular to the horizontal direction, defined as a y-axis direction (an example of a second direction).

The loop electrode groups are configured to form a double layer structure made up of, for example, an X loop electrode group 12 composed of a plurality of loop electrodes X as examples of first electrodes, and a Y loop electrode group 13 composed of a plurality of loop electrodes Y as examples of second electrodes. In this example, on a front side of the transparent substrate 11, the plurality of loop electrodes X, each forming an elongated loop with the y-axis direction as a longitudinal direction of the loop, are arranged at regular intervals in the x-axis direction so as not to overlap with one another to form the X loop electrode group 12. In addition, on a rear side of the transparent substrate 11, the plurality of loop electrodes Y, each forming an elongated loop with the x-axis direction as a longitudinal direction of the loop, are arranged at regular intervals in the y-axis direction so as not to overlap with one another to form the Y loop electrode group 13. In this example, the X loop electrode group 12 is composed of 40 loop electrodes X (X1 to X40), while the Y loop electrode group 13 is composed of 30 loop electrodes Y (Y1 to Y30).

Note that, in the following description, the wording "loop electrode X" will be used when the loop electrodes X1 to X40 need not be distinguished from one another, while, similarly, the wording "loop electrode Y" will be used when the loop electrodes Y1 to Y30 need not be distinguished from one another.

The array pitch of the loop electrodes X and the loop electrodes Y is preferably in the range of, for example, 3 to 6 mm, which approximately corresponds to the size of a contact area when a surface of the position detection sensor 10 is touched with a finger. In addition, because a greater width of a loop coil is desirable for efficient reception of a signal from the electronic pen 2, it is desirable that an interspace between adjacent ones of the loop electrodes X and the loop electrodes Y is as narrow as possible as illustrated in FIG. 1. Thus, in this example, adjacent ones of the loop electrodes X and the loop electrodes Y are arranged in close proximity to each other. Accordingly, the width of the loop of each of the loop electrodes X and the loop electrodes Y measured in the array direction is arranged to be slightly smaller than the array pitch.

In this example, the signal processing circuitry 20, which is connected to the position detection sensor 10, is configured to include selection circuitry 21 for selecting one of the loop electrodes X from the X loop electrode group 12, selection circuitry 22 for selecting one of the loop electrodes Y from the Y loop electrode group 13, mode switch circuitry 23 for making a switch between detection of the first pointer through electromagnetic inductive coupling and detection of the second pointer through capacitive coupling, pen signal reception circuitry 24 that forms an example of first detection circuitry for detecting a position indicated by the first pointer undergoing electromagnetic inductive coupling, touch detection control circuitry 25 that forms an example of second detection circuitry for detecting a position indicated by the second pointer undergoing capacitive coupling, and process control circuitry 26 formed by a computer.

The selection circuitry 21 includes two multiplexers 211 and 212, and winding start terminals (X1a to X40a) of the plurality of loop electrodes X (X1 to X40) are connected to the multiplexer 211, while winding end terminals (X1b to X40b) thereof are connected to the other multiplexer 212. Then, the two multiplexers 211 and 212, in conjunction with each other, are subjected to selection control using selection control signals SEx from the process control circuitry 26, whereby the loop electrodes X are selected one by one sequentially from the X loop electrode group 12 by the selection circuitry 21.

Then, the winding start terminal of the one of the loop electrodes X in the X loop electrode group 12 which has been selected by the selection control signal SEx is selected by the multiplexer 211, and is connected to a common terminal XA of this multiplexer 211, while the winding end terminal of the same loop electrode X is selected by the multiplexer 212, and is connected to a common terminal XB of this multiplexer 212.

Meanwhile, the selection circuitry 22 includes two multiplexers 221 and 222, and winding start terminals (Y1a to Y30a) of the plurality of loop electrodes Y (Y1 to Y30) are connected to the multiplexer 221, while winding end terminals (Y1b to Y30b) thereof are connected to the other multiplexer 222. Then, the two multiplexers 221 and 222, in conjunction with each other, are subjected to selection control using selection control signals SEy from the process control circuitry 26, whereby the loop electrodes Y are selected one by one sequentially from the Y loop electrode group 13 by the selection circuitry 22.

Then, the winding start terminal of the one of the loop electrodes Y in the Y loop electrode group 13 which has been selected by the selection control signal SEy is selected by the multiplexer 221, and is connected to a common terminal YA of this multiplexer 221, while the winding end terminal of the same loop electrode Y is selected by the multiplexer 222, and is connected to a common terminal YB of this multiplexer 222.

The mode switch circuitry 23 includes change switch circuits 23XA and 23XB used for the loop electrodes X, and change switch circuits 23YA and 23YB used for the loop electrodes Y. Then, the common terminal XA of the multiplexer 211 is connected to a movable terminal of the change switch circuit 23XA in the mode switch circuitry 23, while the common terminal XB of the multiplexer 212 is connected to a movable terminal of the change switch circuit 23XB in the mode switch circuitry 23. In addition, the common terminal YA of the multiplexer 221 is connected to a movable terminal of the change switch circuit 23YA in the mode switch circuitry 23, while the common terminal YB of the multiplexer 222 is connected to a movable terminal of the change switch circuit 23YB in the mode switch circuitry 23.

Then, a first fixed terminal P and a second fixed terminal F of each of the change switch circuits 23XA, 23XB, 23YA, and 23YB in the mode switch circuitry 23 are connected to the pen signal reception circuitry 24 and the touch detection control circuitry 25, respectively.

Then, the first fixed terminal P of the change switch circuit 23XA in the mode switch circuitry 23 is connected to an input terminal (in the illustrated example, an inverting input terminal) of an x-side differential input amplifier 24X in the pen signal reception circuitry 24, while the first fixed terminal P of the change switch circuit 23XB is connected to another input terminal (in the illustrated example, a non-inverting input terminal) of the x-side differential input amplifier 24X. In addition, the first fixed terminal P of the change switch circuit 23YA in the mode switch circuitry 23 is connected to an input terminal (in the illustrated example, an inverting input terminal) of a y-side differential input amplifier 24Y in the pen signal reception circuitry 24, while the first fixed terminal P of the change switch circuit 23YB is connected to another input terminal (in the illustrated example, a non-inverting input terminal) of the y-side differential input amplifier 24Y.

Then, although not illustrated in the figures, x-axis signal reception circuitry and y-axis signal reception circuitry are provided in stages subsequent to the x-side differential input amplifier 24X and the y-side differential input amplifier 24Y, respectively, in the pen signal reception circuitry 24. The x-axis signal reception circuitry and the y-axis signal reception circuitry detect the reception levels of pen signals (signals received from the electronic pen 2) detected at the loop electrode X and the loop electrode Y, and supply information of the detected reception levels to the process control circuitry 26. The process control circuitry 26 detects the coordinates (X, Y) of the position on the position detection sensor 10 indicated by the electronic pen 2 from the information supplied from the pen signal reception circuitry 24.

In addition, in this example, the second fixed terminal F of the change switch circuit 23XA and the second fixed terminal F of the change switch circuit 23XB are connected to each other, and a junction thereof is connected to an input terminal of a touch signal detection amplifier 251 in the touch detection control circuitry 25. Meanwhile, the second fixed terminal F of the change switch circuit 23YA and the second fixed terminal F of the change switch circuit 23YB are connected to each other, and a junction thereof is connected to an output terminal of a transmission output driver 252 in the touch detection control circuitry 25. Accordingly, the loop electrode X and the loop electrode Y are shorted at both ends, and therefore, each of the loop electrodes X and Y operates as a single electrode wire.

In a stage previous to the transmission output driver 252, an oscillator circuit 253 is connected thereto, and a frequency signal having a predetermined frequency f is transmitted from the oscillator circuit 253 to the position detection sensor 10 through the transmission output driver 252. In addition, touch detection circuitry (not illustrated), which detects the level of the signal transmitted to the position detection sensor 10 through the transmission output driver 252 and received through the position detection sensor 10, and which supplies information of the detected level of the signal to the process control circuitry 26, is provided in a stage subsequent to the touch signal detection amplifier 251 in the touch detection control circuitry 25.

The process control circuitry 26 detects the coordinates (X, Y) of the position on the position detection sensor 10 indicated by a finger, using a change in level of the signal from the touch detection control circuitry 25 caused at the position indicated by the finger.

The process control circuitry 26 detects the coordinates of the positions indicated by the respective pointers as mentioned above on the basis of the information received from the pen signal reception circuitry 24 and the touch detection control circuitry 25, and also supplies timing control signals to the pen signal reception circuitry 24 and the touch detection control circuitry 25.

In addition, the process control circuitry 26 supplies the selection control signals SEx to the multiplexers 211 and 212 of the selection circuitry 21 to control the loop electrodes X to be selected one by one sequentially from the X loop electrode group 12, and also supplies the selection control signals SEy to the multiplexers 221 and 222 of the selection circuitry 22 to control the loop electrodes Y to be selected one by one sequentially from the Y loop electrode group 13.

Further, the process control circuitry 26 supplies, to the mode switch circuitry 23, a mode switch signal MD to make a switch between a condition (an electromagnetic induction mode) in which the movable terminal of each of the change switch circuits 23XA, 23XB, 23YA, and 23YB is connected to the fixed terminal P, and a condition (a capacitive coupling mode) in which the movable terminal of each of the change switch circuits 23XA, 23XB, 23YA, and 23YB is connected to the fixed terminal F.

In this embodiment, using the mode switch signal MD, the process control circuitry 26 controls the mode switch circuitry 23 to alternate between the fixed terminal P and the fixed terminal F such that each of the fixed terminal P and the fixed terminal F is selected for a period having a predetermined time length, to cause the position detection device 1 to make switching between the electromagnetic induction mode and the capacitive coupling mode in a time division manner.

[Operation of Position Detection Device 1 According to First Embodiment]

In this embodiment, the process control circuitry 26, using the mode switch signal MD, controls the mode switch circuitry 23 to enter a state in which the movable terminal of each of the change switch circuits 23XA, 23XB, 23YA, and 23YB is connected to the fixed terminal P in the period having the predetermined time length, and controls the pen signal reception circuitry 24 to be driven to make a switch to the electromagnetic induction mode. Then, in this period of the electromagnetic induction mode, the process control circuitry 26 controls the multiplexers 211 and 212 of the selection circuitry 21 to select the loop electrodes X one by one from the X loop electrode group 12 such that all the loop electrodes X are selected sequentially, and controls the multiplexers 221 and 222 of the selection circuitry 22 to select the loop electrodes Y one by one from the Y loop electrode group 13 such that all the loop electrodes Y are selected sequentially.

As a result, in the position detection device 1 in the state of this electromagnetic induction mode, respective ends of the one of the loop electrodes X which is selected by the selection circuitry 21 are connected to the inverting input terminal and the non-inverting input terminal of the x-side differential input amplifier 24X in the pen signal reception circuitry 24 as illustrated in FIG. 2. Similarly, respective ends of the one of the loop electrodes Y which is selected by the selection circuitry 22 are connected to the inverting input terminal and the non-inverting input terminal of the y-side differential input amplifier 24Y in the pen signal reception circuitry 24.

At this time, if a position is indicated by the electronic pen 2 on the position detection sensor 10, induced electric currents induced in the loop electrode X and the loop electrode Y in response to the signal from the electronic pen 2 are amplified in the x-side differential input amplifier 24X and the y-side differential input amplifier 24Y, and are supplied to the x-axis signal reception circuitry and the y-axis signal reception circuitry in the subsequent stages, and the levels thereof are detected.

The process control circuitry 26 detects the coordinates (X, Y) of the position indicated by the electronic pen 2 on the position detection sensor on the basis of timing of switching of the multiplexers 211 and 212 of the selection circuitry 21 and the multiplexers 221 and 222 of the selection circuitry 22 using the selection control signals SEx and the selection control signals SEy, and an output of reception detection of the signal transmitted from the electronic pen 2 from the pen signal reception circuitry 24, as described above.

Then, in this embodiment, once the period of the electromagnetic induction mode ends, the process control circuitry 26, using the mode switch signal MD, causes the movable terminal of each of the change switch circuits 23XA, 23XB, 23YA, and 23YB in the mode switch circuitry 23 to be connected to the fixed terminal F, and controls the touch detection control circuitry 25 to be driven to make a switch to the capacitive coupling mode. Then, in the period of this capacitive coupling mode also, the process control circuitry 26, using the selection control signals SEx and the selection control signals SEy, controls the selection circuitry 21 and the selection circuitry 22 to make switches such that the loop electrodes X are selected one by one sequentially from the X loop electrode group 12, and the loop electrodes Y are selected one by one sequentially from the Y loop electrode group 13.

Figure 3:
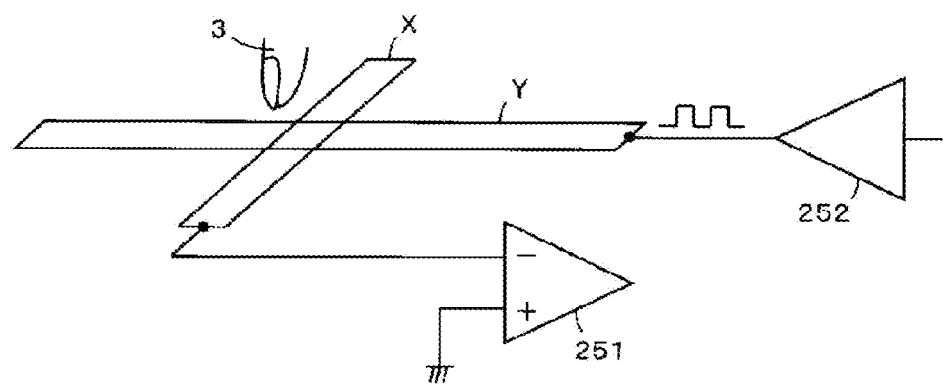
FIG. 3 is a diagram for explaining an operating state of the position detection device according to the first embodiment in a capacitive coupling mode.

As illustrated in FIG. 3, in the position detection device 1 in this capacitive coupling mode, a signal having the predetermined frequency is sequentially supplied from the oscillator circuit 253 through the transmission output driver 252 of the touch detection control circuitry 25 to each one of the loop electrodes Y which is selected by the selection circuitry 22 and acts as a single electrode wire with the common terminal YA, to which the winding start terminal is connected, and the common terminal YB, to which the winding end terminal is connected, connected to each other. In addition, each one of the loop electrodes X which is selected by the selection circuitry 21 and acts as a single electrode wire with the common terminal XA, to which the winding start terminal is connected, and the common terminal XB, to which the winding end terminal is connected, connected to each other is connected to the inverting input terminal of the touch signal detection amplifier 251 in the touch detection control circuitry 25.

At this time, the signal transmitted to the shorted loop electrode Y through the transmission output driver 252 is received by the shorted loop electrode X, and the reception level thereof is supplied to the touch signal detection amplifier 251. When the position detection sensor 10 is being touched by a finger 3, a part of the signal transmitted to the loop electrode Y is caused to pass through the finger 3 and a human body, resulting in a reduction in a signal to be transferred from the loop electrode Y at the position touched by the finger to the loop electrode X. The process control circuitry 26 detects the coordinates of the position touched by the finger by detecting a change in level of the reception signal from the touch detection control circuitry 25.

Then, in this embodiment, once the period of the capacitive coupling mode ends, the process control circuitry 26 makes a switch to the electromagnetic induction mode using the mode switch signal MD as described above. Thereafter, the electromagnetic induction mode and the capacitive coupling mode are similarly repeated in the time division manner.

As described above, the position detection device 1 according to the above-described first embodiment is able to detect the coordinates of the position indicated by the electronic pen 2 by an electromagnetic induction method, and is also able to detect the coordinates of the position indicated by the finger 3 by a capacitive coupling method, using the position detection sensor 10 in which the X loop electrode group 12 and the Y loop electrode group 13 are formed.

In addition, in the position detection device 1 according to the first embodiment, instead of linear electrodes, the X loop electrode group 12 and the Y loop electrode group 13 are formed in the position detection sensor 10, and this eliminates the need to form loop electrodes by connecting end portions of the linear electrodes. This allows the position detection device 1 to have a simple structure with use of the selection circuitry 21, which selects each of the loop electrodes X from the X loop electrode group 12, the selection circuitry 22, which selects each of the loop electrodes Y from the Y loop electrode group 13, and the mode switch circuitry 23.

Second Embodiment

In the position detection device 1 according to the above-described first embodiment, the selection circuitry 21 and the selection circuitry 22 are configured to select the loop electrodes X and the loop electrodes Y, respectively, one by one sequentially in both the electromagnetic induction mode and the capacitive coupling mode. However, in the electromagnetic induction mode, a plurality of adjacent loop electrodes may be simultaneously selected from each of the X loop electrode group 12 and the Y loop electrode group 13 to equivalently form a loop coil having a large width, to enable more efficient detection of the signal from the electronic pen 2. A second embodiment described below corresponds to such a configuration. Because an operation of the capacitive coupling mode remains the same as in the first embodiment, an operation of the electromagnetic induction mode will mainly be described in the following description.

<First Example of Second Embodiment>

FIGS. 4 to 7 are diagrams for explaining an example configuration of a position detection device 1A according to the second embodiment, which is configured to simultaneously select two adjacent loop electrodes X and two adjacent loop electrodes Y.

Figure 4:
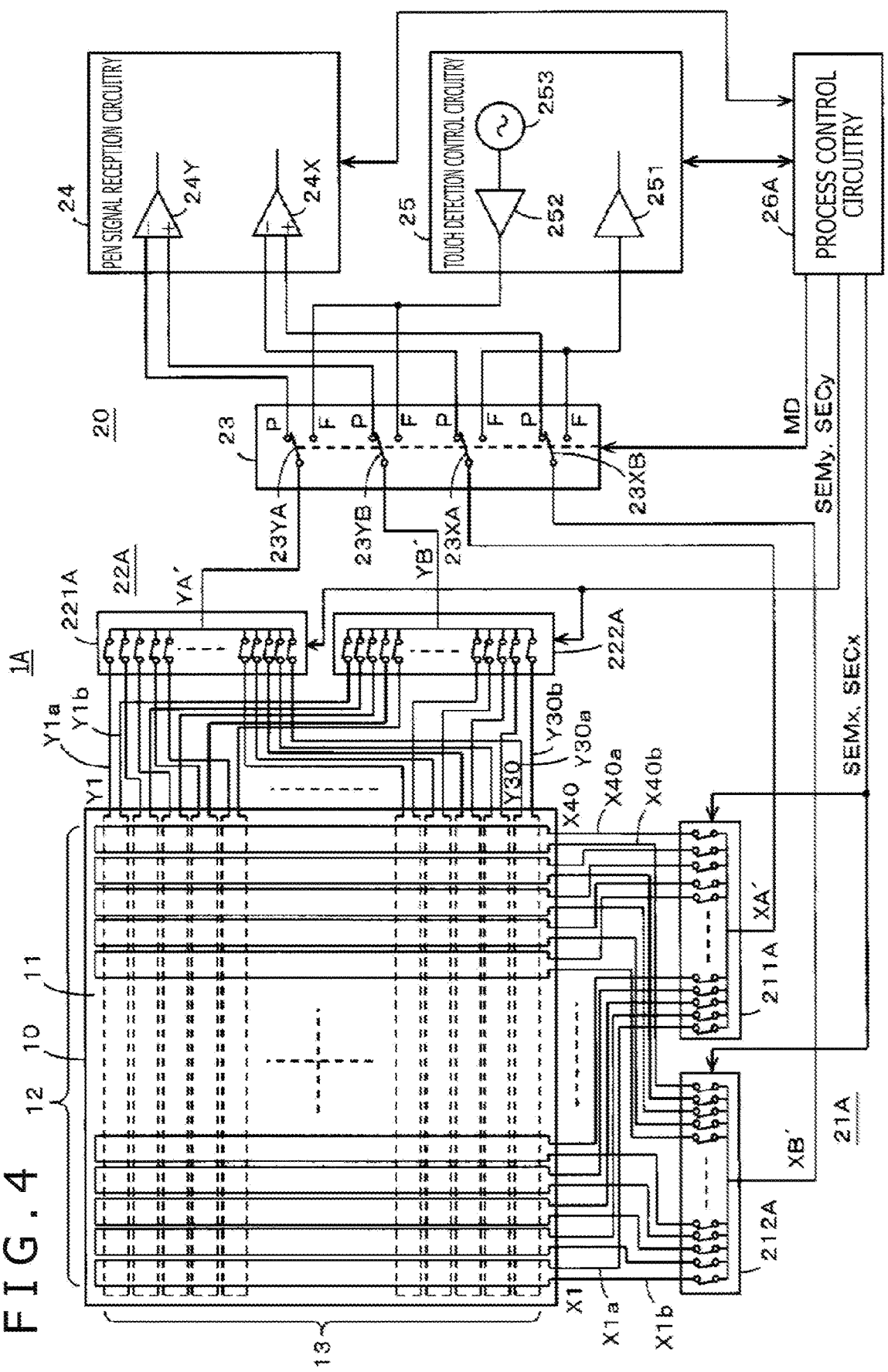
FIG. 4 is a diagram illustrating an example configuration of a position detection device according to a second embodiment of this disclosure.

FIG. 4 is a diagram illustrating the example configuration of the position detection device 1A according to the second embodiment. As illustrated in FIG. 4, in the position detection device 1A according to the second embodiment, selection circuitry 21A and selection circuitry 22A are provided in place of the selection circuitry 21 and the selection circuitry 22 in the position detection device 1 according to the first embodiment, and process control circuitry 26A is provided in place of the process control circuitry 26. The position detection device 1A is otherwise similar in structure to the position detection device 1 according to the first embodiment. In FIG. 4, components that have their equivalents in the position detection device 1 according to the above-described first embodiment are denoted by the same reference symbols as those of their equivalents, and descriptions thereof are omitted.

In the second embodiment, the selection circuitry 21A includes a selection switch 211A and a selection switch 212A. As illustrated in FIG. 4, each of the selection switch 211A and the selection switch 212A includes the same number of switches as that of loop electrodes X (X1 to X40), and each of winding start terminals X1a to X40a of the loop electrodes X (X1 to X40) is connected to one end of the corresponding switch in the selection switch 211A, while each of winding end terminals X1b to X40b thereof is connected to one end of the corresponding switch in the selection switch 212A.

In addition, ends of all the switches in the selection switch 211A on an opposite side are connected to each other, and are connected to a common terminal XA' of the selection switch 211A. Similarly, ends of all the switches in the selection switch 212A on an opposite side are connected to each other, and are connected to a common terminal XB' of the selection switch 212A. The common terminal XA' of the selection switch 211A is connected to a movable terminal of a change switch circuit 23XA in mode switch circuitry 23, while the common terminal XB' of the selection switch 212A is connected to a movable terminal of a change switch circuit 23XB in the mode switch circuitry 23.

Then, in a first example of the second embodiment, in the electromagnetic induction mode, the selection switch 211A and the selection switch 212A are controlled, through selection control signals SEMx from the process control circuitry 26A, to simultaneously select two adjacent ones of the loop electrodes X from the X loop electrode group 12 such that the two loop electrodes X selected are sequentially shifted one by one.

FIG. 5 is a diagram for explaining selection control for selecting a plurality of switches in the selection switches 211A and 212A in the electromagnetic induction mode in the position detection device 1A according to the first example of the second embodiment. FIG. 5 illustrates how the switches to which the loop electrodes X1 to X40 in the X loop electrode group 12 are respectively connected are turned on and off in the selection switches 211A and 212A as time passes, and "1" represents turning on while "0" represents turning off. In the electromagnetic induction mode, the selection control as illustrated in FIG. 5 is repeatedly performed through the selection control signals SEMx and SEMy.

Specifically, the selection switch 211A and the selection switch 212A of the selection circuitry 21A select the same, two adjacent loop electrodes X sequentially, and, at first, turn on the two switches to which the loop electrodes X1 and X2 are connected, and connect these loop electrodes X1 and X2 to the common terminals XA' and XB'. Next, the two switches to which the loop electrodes X2 and X3 are connected are turned on, and these loop electrodes X2 and X3 are connected to the common terminals XA' and XB'. Further, two loop electrodes X sequentially selected such that the loop electrodes X selected are shifted one by one, such as the loop electrodes X3 and X4, the loop electrodes X4 and X5, the loop electrodes X5 and X6, and so on, are connected to the common terminals XA' and XB'.

The common terminals XA' and XB' are connected to an x-side differential input amplifier 24X in pen signal reception circuitry 24 through fixed terminals P in the mode switch circuitry 23, and therefore, in the pen signal reception circuitry 24, the reception level of a pen signal is detected with respect to the two loop electrodes X selected sequentially.

Figure 6:
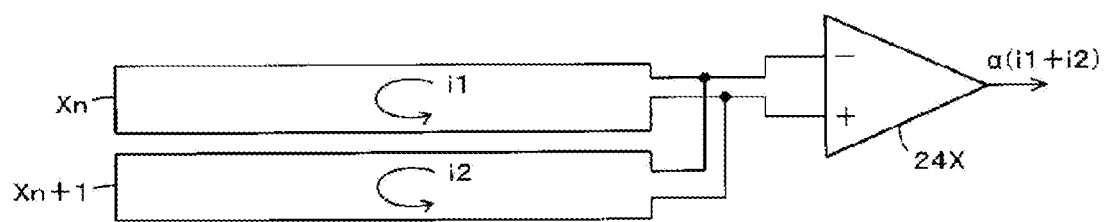
FIG. 6 is a diagram for explaining an operation of the position detection device according to the first example of the second embodiment in the electromagnetic induction mode.

As illustrated in FIG. 6, when two adjacent loop electrodes X are simultaneously selected as described above, two coils are connected in parallel, allowing a supply to be provided to the x-side differential input amplifier 24X. In this case, assuming that electric currents induced in two adjacent loop electrodes Xn and Xn+1 (n=1, 2, . . . , 39) through electromagnetic inductive coupling with the electronic pen 2 are denoted by i1 and i2, respectively, an output α(i1+i2), which corresponds to a sum of the electric currents induced in the two loop electrodes Xn and Xn+1, is obtained in the x-side differential input amplifier 24X.

Figure 7:
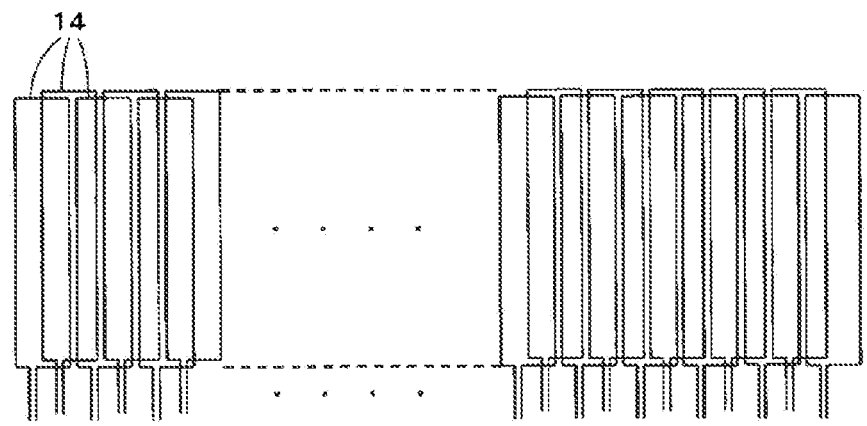
FIG. 7 is a diagram illustrating an example arrangement of loop coils of a position detection sensor equivalent to a position detection sensor of the position detection device according to the first example of the second embodiment.

Detecting the signals from the electronic pen 2 with the selection switch 211A and the selection switch 212A being controlled to select two adjacent loop electrodes X sequentially in the order illustrated in FIG. 5 as described above is equivalent to a well-known detection method of selecting loop coils 14 disposed so as to overlap with one another in due order employing the electromagnetic induction method as illustrated in FIG. 7. In the case of this example, a loop coil having a width equal to twice the array pitch of the loop electrodes can be formed by selecting two adjacent loop electrodes simultaneously.

While the foregoing description has been made with respect to the selection circuitry 21A for the X loop electrode group 12, which is used to obtain an x-coordinate, a similar configuration can be implemented with respect to the selection circuitry 22A for the Y loop electrode group 13, which is used to obtain a y-coordinate.

That is, in the second embodiment, the selection circuitry 22A includes a selection switch 221A and a selection switch 222A, each of which includes the same number of switches as that of loop electrodes Y (Y1 to Y30), and as illustrated in FIG. 4, each of winding start terminals Y1a to Y30a of the loop electrodes Y (Y1 to Y30) is connected to one end of the corresponding switch in the selection switch 221A, while each of winding end terminals Y1b to Y30b thereof is connected to one end of the corresponding switch in the selection switch 222A.

In addition, ends of all the switches in the selection switch 221A on an opposite side are connected to each other, and are connected to a common terminal YA' of the selection switch 221A, while ends of all the switches in the selection switch 222A on an opposite side are connected to each other, and are connected to a common terminal YB' of the selection switch 222A. Then, the common terminal YA' of the selection switch 221A is connected to a movable terminal of a change switch circuit 23YA in the mode switch circuitry 23, while the common terminal YB' of the selection switch 222A is connected to a movable terminal of a change switch circuit 23YB in the mode switch circuitry 23.

Then, in the first example of the second embodiment, in the electromagnetic induction mode, the selection switch 221A and the selection switch 222A are controlled, through selection control signals SEMy from the process control circuitry 26A, to simultaneously select two adjacent ones of the loop electrodes Y such that the two loop electrodes Y selected are sequentially shifted one by one, in a manner similar to that in which the above-described control is performed to sequentially select two adjacent ones of the loop electrodes X from the X loop electrode group 12.

Accordingly, an operation similar to the operation illustrated in FIG. 6 is performed with respect to the loop electrodes Y as well, and an output α(i1+i2), which corresponds to a sum of electric currents induced in two loop electrodes Ym and Ym+1 (m=1, 2, . . . , 29), is obtained in a y-side differential input amplifier 24Y in the pen signal reception circuitry 24. In addition, a detection method employed for the Y loop electrode group 13 is also equivalent to the well-known detection method of selecting loop coils disposed so as to overlap with one another in due order employing the electromagnetic induction method.

Note that, as mentioned above, also in the second embodiment, the selection switch 211A and the selection switch 212A, or the selection switch 221A and the selection switch 222A, are controlled to select the loop electrodes X or the loop electrodes Y, respectively, one by one in the capacitive coupling mode. Accordingly, in the capacitive coupling mode, SECx and SECy for causing the switches to be turned on one by one are supplied from the process control circuitry 26A to the selection switch 211A and the selection switch 212A, and the selection switch 221A and the selection switch 222A, respectively.

<Second Example of Second Embodiment>

In the above-described first example, in the electromagnetic induction mode, a plurality of (in this example, two) adjacent loop electrodes X and a plurality of (in this example, two) adjacent loop electrodes Y are simultaneously selected, but more than two adjacent loop electrodes X and loop electrodes Y may be simultaneously selected. A second example corresponds to an example of such a case, and a case where three adjacent loop electrodes are simultaneously selected will be described below.

Also, in the case of the second example, the configuration of the position detection device 1A as illustrated in FIG. 4 as it is used as the configuration of the position detection device. The position detection device according to the second example is different from the position detection device according to the first example in the selection control signals SEMx and SEMy supplied from the process control circuitry 26A to the two selection switches 211A and 212A of the selection circuitry 21A and the two selection switches 221A and 222A of the selection circuitry 22A, respectively, in the electromagnetic induction mode.

FIG. 8 is a diagram for explaining selection control for selecting a plurality of switches in the selection switches 211A and 212A in the electromagnetic induction mode in the position detection device 1A according to the second example of the second embodiment.

In this example, the selection switch 211A and the selection switch 212A of the selection circuitry 21A select the same, three adjacent loop electrodes X sequentially, and, at first, turn on the three switches to which the loop electrodes X1, X2, and X3 are connected, and connect these loop electrodes X1, X2, and X3 to the common terminals XA' and XB'. Next, the three switches to which the loop electrodes X2, X3, and X4 are connected are turned on, and these loop electrodes X2, X3, and X4 are connected to the common terminals XA' and XB'. Further, three loop electrodes X sequentially selected such that the loop electrodes X selected are shifted one by one, such as the loop electrodes X3, X4, and X5, the loop electrodes X4, X5, and X6, the loop electrodes X5, X6, and X7, and so on, are connected to the common terminals XA' and XB'.

Figure 9:
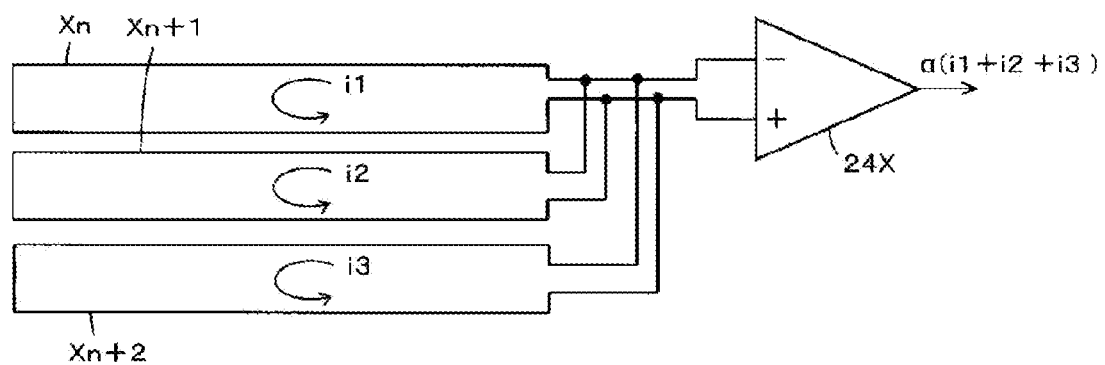
FIG. 9 is a diagram for explaining the operation of the position detection device according to the second example of the second embodiment in the electromagnetic induction mode.

As illustrated in FIG. 9, when three adjacent loop electrodes X are simultaneously selected as described above, three loop electrodes X (coils) are connected in parallel, allowing a supply to be provided to the x-side differential input amplifier 24X. In this case, assuming that electric currents induced in three adjacent loop electrodes Xn, Xn+1, and Xn+2 (n=1, 2, . . . , 38) through electromagnetic inductive coupling with the electronic pen 2 are denoted by i1, i2, and i3, respectively, an output α(i1+i2+i3), which corresponds to a sum of the electric currents induced in the three loop electrodes Xn, Xn+1, and Xn+2, is obtained in the x-side differential input amplifier 24X.

Figure 10:
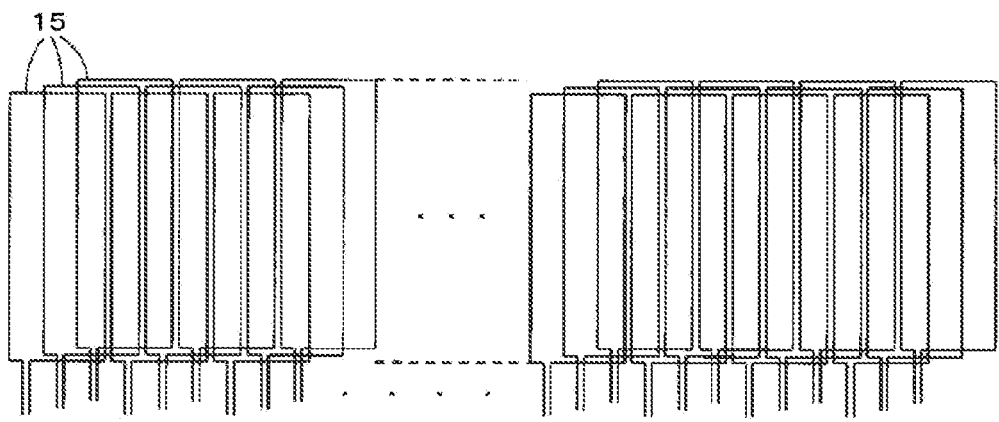
FIG. 10 is a diagram illustrating an example arrangement of loop coils of a position detection sensor equivalent to a position detection sensor of the position detection device according to the second example of the second embodiment.

Detecting the signals from the electronic pen 2 with the selection switch 211A and the selection switch 212A being controlled to select three adjacent loop electrodes X sequentially in the order illustrated in FIG. 8 as described above is equivalent to a well-known detection method of selecting loop coils 15 disposed so as to overlap with one another in due order employing the electromagnetic induction method as illustrated in FIG. 10. In the case of this example, a loop coil having a width equal to three times the array pitch of the loop electrodes X can be formed by selecting three adjacent loop electrodes simultaneously.

A similar configuration can be implemented with respect to the selection circuitry 22A for the Y loop electrode group 13, which is used to obtain a y-coordinate, and in this case, three coils are connected in parallel, allowing a supply to be provided to the y-side differential input amplifier 24Y.

Third Embodiment

In the position detection device 1A according to the above-described second embodiment, in the electromagnetic induction mode, the selection circuitry 21A and the selection circuitry 22A are controlled to select a plurality of loop electrodes X and a plurality of loop electrodes Y, respectively, to connect them in parallel as illustrated in FIGS. 6 and 9, but the selection circuitries may alternatively be configured to connect loop electrodes (coils) in series when a plurality of adjacent loop electrodes X and a plurality of adjacent loop electrodes Y have been selected. A third embodiment corresponds to an example of such a case.

Figure 11:
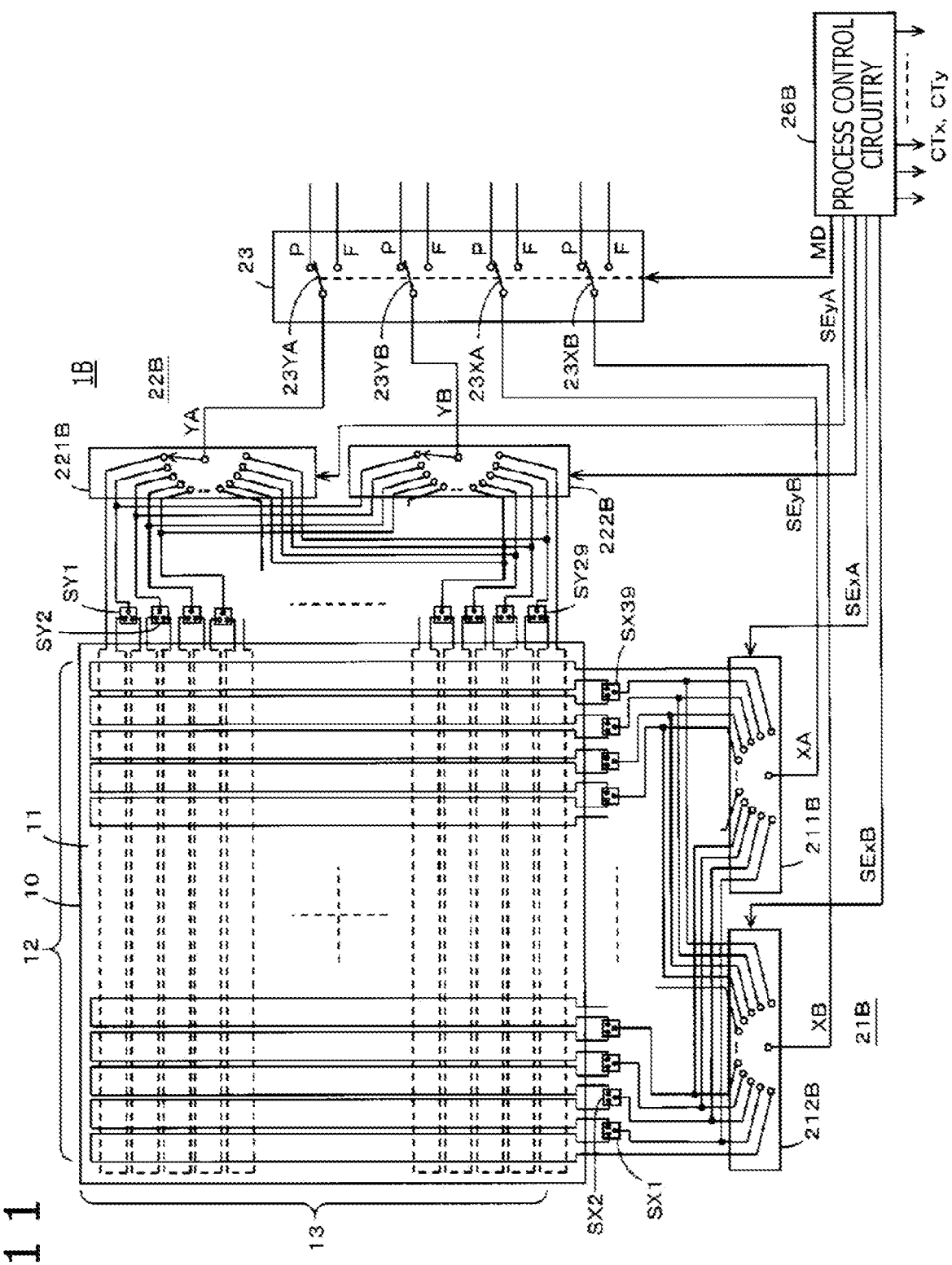
FIG. 11 is a diagram illustrating an example configuration of a position detection device according to a third embodiment of this disclosure.

FIG. 11 is a diagram for explaining an example configuration of a position detection device 1B according to a third embodiment. The following description focuses on an operation of the position detection device 1B according to the third embodiment in the electromagnetic induction mode.

As illustrated in FIG. 11, in the position detection device 1B according to the third embodiment, selection circuitry 21B and selection circuitry 22B are provided in place of the selection circuitry 21 and the selection circuitry 22 in the position detection device 1 according to the first embodiment, and process control circuitry 26B is provided in place of the process control circuitry 26. The position detection device 1B is otherwise similar in structure to the position detection device 1 according to the first embodiment. In FIG. 11, components that have their equivalents in the position detection device 1 according to the above-described first embodiment are denoted by the same reference symbols as those of their equivalents, and descriptions thereof are omitted. Note that, in FIG. 11, illustration of pen signal reception circuitry 24 and touch detection control circuitry 25 is omitted.

In the third embodiment, the selection circuitry 21B includes multiplexers 211B and 212B, which are similar in structure to the multiplexers 211 and 212 according to the first embodiment, and a plurality of 3-terminal switches, in this example, 39 3-terminal switches SX1 to SX39, the number of which is smaller than the number of loop electrodes X (X1 to X40) by one. Each 3-terminal switch is a switch that includes three terminals, i.e., a first terminal, a second terminal, and a third terminal, and which can be configured to connect two freely-selected terminals among the three terminals to each other through a configuration control signal.

Then, each of winding end terminals X1$b$ to X39$b$ of the loop electrodes X (X1 to X39) is connected to the first terminal of a corresponding one of the 3-terminal switches SX1 to SX39, while each of winding start terminals X2$a$ to X40$a$ of the loop electrodes X (X2 to X40) is connected to the second terminal of a corresponding one of the 3-terminal switches SX1 to SX39. In addition, the third terminal of each of the 3-terminal switches SX1 to SX39 is connected to the multiplexers 211B and 212B. Notice that a winding start terminal X1$a$ of the loop electrode X1 is directly connected to the multiplexer 212B, while a winding end terminal X40$b$ of the loop electrode X40 is directly connected to the multiplexer 211B.

Then, in this embodiment, in addition to sending a mode switch signal MD, the process control circuitry 26B sends, to each of the 3-terminal switches SX1 to SX39, a configuration control signal CTx for controlling the configuration thereof, and sends a selection control signal SExA and a selection control signal SExB to the multiplexer 211B and the multiplexer 212B, respectively.

For example, in the case where two adjacent loop electrodes X are to be connected in series, at first, the 3-terminal switch SX1, to the first terminal of which the winding end terminal X1$b$ of the loop electrode X1 is connected, is controlled and configured to connect the first terminal and the second terminal to each other, and the 3-terminal switch SX2, to the first terminal of which the winding end terminal X2$b$ of the adjacent loop electrode X2 is connected, is controlled and configured to connect the first terminal and the third terminal to each other. In addition, the multiplexer 211B is controlled to select the 3-terminal switch SX2, and the multiplexer 212B is controlled to select the winding start terminal X1$a$ of the loop electrode X1.

Next, the 3-terminal switch SX1 is controlled and configured to connect the first terminal and the third terminal to each other, the 3-terminal switch SX2 adjacent thereto is controlled and configured to connect the first terminal and the second terminal to each other, and the 3-terminal switch SX3 adjacent thereto is controlled and configured to connect the first terminal and the third terminal to each other. In addition, the multiplexer 211B is controlled to select the 3-terminal switch SX3, in which the first terminal and the third terminal are connected to each other, and the multiplexer 212B is controlled to select the 3-terminal switch SX1, in which, similarly, the first terminal and the third terminal are connected to each other.

Thereafter, sets of three adjacent 3-terminal switches SXn to SXn+2 are sequentially subjected to configuration control such that the three adjacent 3-terminal switches are sequentially shifted by one 3-terminal switch. Of the three adjacent 3-terminal switches SXn to SXn+2, each of the 3-terminal switches SXn and SXn+2 at both ends is controlled and configured to connect the first terminal to the third terminal, and the 3-terminal switch SXn+1 in the middle is controlled and configured to connect the first terminal to the second terminal. In addition, the multiplexer 211B and the multiplexer 212B are controlled to select the 3-terminal switch SXn+2 and the 3-terminal switch SXn, respectively, at both ends.

Figure 12:
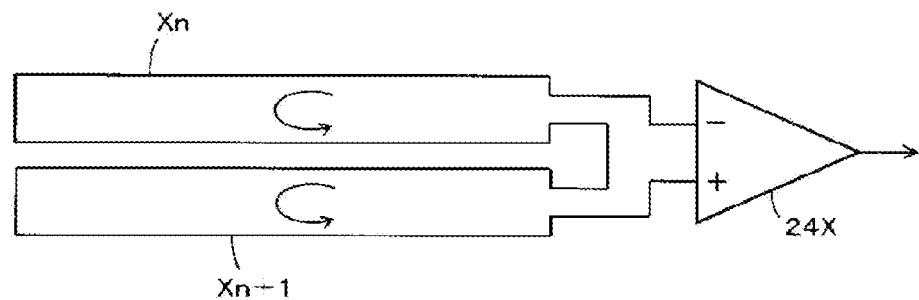
FIG. 12 is a diagram for explaining an operating state of the position detection device according to the third embodiment in the electromagnetic induction mode.

When the selection control of the selection circuitry 21B is performed in the above-described manner, two loop electrodes X (coils) are connected in series as illustrated in FIG. 12, allowing a supply to be provided to an x-side differential input amplifier 24X, and an output corresponding to a sum of electric currents induced in the two loop electrodes X is obtained in the x-side differential input amplifier 24X.

Note that this disclosure is not limited to the case where two loop electrodes are connected in series, and that control may be performed such that three adjacent loop electrodes X are connected in series while the three loop electrodes X that make a set are sequentially shifted one by one. In the case of three or more loop electrodes X, the 3-terminal switches to which the loop electrodes X are connected are controlled such that the winding start terminals of the loop electrodes X at both ends are connected to the multiplexers 211B and 212B, while the winding end terminal and the winding start terminal of adjacent ones of the loop electrodes X in the middle are connected to each other.

While the foregoing description has been made with respect to the X loop electrode group 12, a similar configuration can be implemented with respect to the selection circuitry 22B for the Y loop electrode group 13 so that similar control can be performed such that a plurality of loop electrodes Y are sequentially connected in series. In this case, the selection circuitry 22B includes multiplexers 221B and 222B, which are similar in structure to the multiplexers 221 and 222 according to the first embodiment, and a plurality of 3-terminal switches, in this example, 29 3-terminal switches SY1 to SY29, the number of which is smaller than the number of loop electrodes Y (Y1 to Y30) by one.

Then, the multiplexers 221B and 222B in the selection circuitry 22B and the 3-terminal switches SY1 to SY29 can be controlled through selection control signals SEyA and SEyB and configuration control signals CTy from the process control circuitry 26B to sequentially select a plurality of adjacent loop electrodes Y and connect them in series in a manner similar to that for the X loop electrode group 12.

Note that, in the capacitive coupling mode according to the third embodiment, the loop electrodes X are selected one by one by the selection circuitry 21B, and the loop electrodes Y are selected one by one by the selection circuitry 22B as in the second embodiment.

Other Embodiments

In the position detection sensor 10 according to each of the above-described embodiments, the loop electrodes X and the loop electrodes Y are formed on the transparent substrate 11 by electrically conductive materials that can be made substantially transparent, such as metal mesh electrodes made up of thin lines of ITO, silver, copper, or the like. Accordingly, each of the lines of the electrodes of the position detection sensor 10 is formed as a pattern having a predetermined width, such as, for example, approximately one millimeter. When the position detection sensor that uses such electrode lines is used for a touch detection operation, inside portions of the loop electrodes X and the loop electrodes Y in the width direction form electrical cavities, reducing a capacitance in relation to a human body, such as a finger, at a middle portion of each of the loop electrodes X and the loop electrodes Y, making it difficult to accurately determine a position indicated by a finger.

Figure 13A:
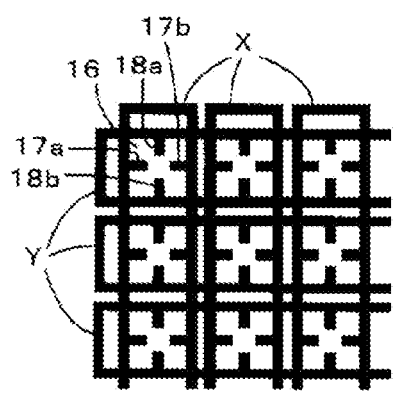
FIGS. 13A and 13B illustrate diagrams for explaining other examples of position detection sensors of position detection devices according to this disclosure.
Figure 13B:
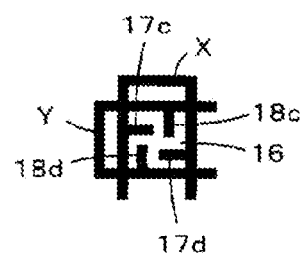

To solve such a problem, projecting portions that project from the patterns of the electrode lines of the loop electrodes X and the loop electrodes Y inward in the width direction of each of the loop electrodes X and in the width direction of each of the loop electrodes Y may be formed. FIGS. 13A and 13B illustrate examples of the projecting portions that project from the patterns of the electrode lines of the loop electrodes X and the loop electrodes Y inward in the width direction of each of the loop electrodes X and in the width direction of each of the loop electrodes Y.

As illustrated in FIGS. 13A and 13B, in a position detection sensor, the loop electrodes X and the loop electrodes Y are arranged to cross at right angles, and therefore, a rectangular cavity region 16 is formed within the width of each loop electrode X and the width of each loop electrode Y.

In the example of FIG. 13A, two projecting portions 17a and 17b, which are opposite to each other and which are arranged to project from each of the electrode line patterns of the loop electrodes X in such directions as to intersect the electrode line pattern at right angles and at such positions as to extend toward a center of the rectangular cavity region 16, are formed. In addition, two projecting portions 18a and 18b, which are opposite to each other and which are arranged to project from each of the electrode line patterns of the loop electrodes Y in such directions as to intersect the electrode line pattern at right angles at a middle position of the rectangular cavity region 16, are formed.

Meanwhile, in the example of FIG. 13B, projecting portions 17c and 17d, which are arranged to project in such directions as to intersect each of the electrode line patterns of the loop electrodes X at right angles, are formed, but in this example, the projecting portions 17c and 17d are not opposite to each other, and are each arranged to extend toward a position displaced from the center of the rectangular cavity region 16. Similarly, projecting portions 18c and 18d, which are arranged to project in such directions as to intersect each of the electrode line patterns of the loop electrodes Y at right angles, are formed, but in this example, the projecting portions 18c and 18d are not opposite to each other, and are each arranged to extend toward a position displaced from the center of the rectangular cavity region 16.

According to the position detection sensors in which the electrode patterns are formed as illustrated in FIGS. 13A and 13B mentioned above, a finger touching any rectangular cavity region 16 essentially touches the corresponding loop electrode X and the corresponding loop electrode Y since the projecting portions 17a and 17b and the projecting portions 18a and 18b, or the projecting portions 17c and 17d and the projecting portions 18c and 18d, exist in the cavity region 16, enabling the finger touch to be detected more easily.

Even when the projecting portions 17a and 17b and the projecting portions 18a and 18b, or the projecting portions 17c and 17d and the projecting portions 18c and 18d, are provided inside of the loop electrodes X and Y as described above, the projecting portions 17a and 17b and the projecting portions 18a and 18b, or the projecting portions 17c and 17d and the projecting portions 18c and 18d, hardly affect a reception of a magnetic field signal from the electronic pen during an operation of receiving a pen signal, because a magnetic field radiating from the electronic pen is radiated over a sufficiently large area compared to the line width of the projecting portions.

Other Embodiments or Modifications

In the above-described embodiment, in the capacitive coupling mode, each of the loop electrodes X and the loop electrodes Y is shorted with the winding start terminal and the winding end terminal connected to each other, but one of the winding start terminal and the winding end terminal may be made open (an open terminal), and the other of the winding start terminal and the winding end terminal may be made a terminal portion connected to the touch detection control circuitry 25.

In addition, in the above-described embodiment, the position detection sensor 10 is formed as a transparent sensor having the transparent substrate 11, and the loop electrodes X and the loop electrodes Y formed by the metal mesh electrodes made up of the thin lines of ITO, silver, copper, or the like, but it is needless to say that the position detection sensor 10 may alternatively be formed as a non-transparent sensor for applications in which the position detection sensor 10 is not disposed on a display screen of a display device.

In addition, in the above-described embodiment, differential amplifiers are used in amplification circuits for an x-side input and a y-side input of the pen signal reception circuitry 24, but alternatively, one end of each of the loop electrodes X and the loop electrodes Y may be connected to a fixed potential with the other end being applied to a single-input amplifier.

In addition, in each of the above-described embodiments, the position detection device 1, 1A, or 1B is configured to switch the mode between the electromagnetic induction mode and the capacitive coupling mode in the time division manner using the mode switch signal MD from the process control circuitry 26, 26A, or 26B. Note, however, that the switching between the electromagnetic induction mode and the capacitive coupling mode may naturally be manually carried out by a user. In this case, the position detection device is provided with a change switch or a push button switch on which a switching operation can be performed by the user, and, for example, the process control circuitry is configured to switch the mode between the electromagnetic induction mode and the capacitive coupling mode according to the switch state of the change switch or the push button switch.

In addition, the position detection device may be configured to switch the mode to the electromagnetic induction mode when the position detection device is in such a condition as to receive a signal from the electronic pen through the position detection sensor, and switch the mode to the capacitive coupling mode when the position detection device is not in such a condition as to receive a signal from the electronic pen through the position detection sensor.

In addition, each of the electronic pen and the position detection device may be provided with, for example, a short-range wireless communication circuit compliant with the Bluetooth (registered trademark) standard, and the position detection device may be configured to switch the mode to the electromagnetic induction mode when the short-range wireless communication circuit of the position detection device has received a signal from the electronic pen, and switch the mode to the capacitive coupling mode when the short-range wireless communication circuit of the position detection device is not in such a condition as to receive a signal from the electronic pen.

In addition, in each of the above-described embodiments, the second pointer to be detected in the capacitive coupling mode is assumed to be a finger of a human body, but the second pointer may alternatively be a passive capacitive electronic pen. Further, the second pointer may alternatively be an active capacitive electronic pen. In the case where the active capacitive electronic pen is used, circuitry configured to receive a signal from the active capacitive electronic pen with respect to each of a loop electrode X and a loop electrode Y and detect the level thereof is provided in place of the touch detection control circuitry 25.

In addition, in each of the above-described embodiments, in the electromagnetic induction mode, the position indicated by the electronic pen 2 is detected by receiving the signal from the electronic pen 2 provided with an oscillator circuit. Note, however, that this is not essential to this disclosure, and that an electronic pen provided with a resonant circuit including a coil and a capacitor may be used, and the position detection device may be configured to, in the electromagnetic induction mode, transmit an alternating-current signal to the electronic pen through electromagnetic inductive coupling, and receive a signal fed back through the resonant circuit of the electronic pen, to detect the position indicated by the electronic pen. In this case, the X loop electrode group 12 and the Y loop electrode group 13 may be used as a means for transmitting the alternating-current signal to the electronic pen, or alternatively, an additional loop coil may be provided for this transmission.

DESCRIPTION OF REFERENCE SYMBOLS

1, 1A, 1B . . . Position detection device, 2 . . . Electronic pen, 3 . . . Finger, 10 . . . Position detection sensor, 11 . . . Transparent substrate, 12 . . . X loop electrode group, 13 . . . Y loop electrode group, 17*a*, 17*b*, 17*c*, 17*d* . . . Projecting portion, 18*a*, 18*b*, 18*c*, 18*d* . . . Projecting portion, 21, 21A, 21B . . . Selection circuitry for X loop electrodes, 22, 22A, 22B . . . Selection circuitry for Y loop electrodes, 23 . . . Mode switch circuitry, 24 . . . Pen signal reception circuitry, 25 . . . Touch detection control circuitry

The invention claimed is:

1. A position detection device comprising:
    a position detection sensor having a plurality of first loop electrodes arranged in a first direction, and a plurality of second loop electrodes arranged in a second direction perpendicular to the first direction,
    wherein each of the first loop electrodes is elongated in the second direction, and
    wherein each of the second loop electrodes is elongated in the first direction; and
    first selection circuitry coupled to the plurality of first loop electrodes of the position detection sensor,
    wherein the first selection circuitry, in operation, simultaneously selects two of the plurality of first loop electrodes, connects a first terminal of each of the two of the plurality of first loop electrodes to a first one of two first common terminals, and connects a second terminal of each of the two of the plurality of first loop electrodes to a second one of the two first common terminals, without connecting the plurality of first loop electrodes other than the two of the plurality of first loop electrodes to the two first common terminals, and
    wherein the two of the plurality of first loop electrodes change sequentially over time from a first two of the plurality of first loop electrodes to a last two of the plurality of first loop electrodes.

2. The position detection device according to claim 1 wherein:
    the first selection circuitry, in operation, simultaneously selects a first one and a second one the plurality of first loop electrodes during an initial time period, and
    the first selection circuitry, in operation, simultaneously selects the second one and a third one of the plurality of first loop electrodes during a second time period that immediately follows the initial time period.

3. The position detection device according to claim 1 wherein:
    the first selection circuitry includes a first selection switch and a second selection switch,
    the first one of the two first common terminals is a common terminal of the first selection switch and the second one of the two first common terminals is a common terminal of the second selection switch, the first selection switch, in operation, connects the first terminal of each of the two of the plurality of first loop electrodes to the common terminal of the first selection switch, and the second selection switch, in operation, connects the second terminal of each of the two of the plurality of first loop electrodes to the common terminal of the second selection switch.

4. The position detection device according to claim 1, further comprising:

mode switch circuitry coupled to the two first common terminals, wherein, in a first mode of operation, the two first common terminals are respectively coupled to two input terminals of a first amplifier, and wherein, in a second mode of operation, the two first common terminals are coupled to an input terminals of a second amplifier that is different from the first amplifier.

5. The position detection device according to claim 4 wherein the first amplifier is a differential amplifier.

6. The position detection device according to claim 1, further comprising:

second selection circuitry coupled to the plurality of second loop electrodes of the position detection sensor, wherein the second selection circuitry, in operation, simultaneously selects two of the plurality of second loop electrodes, connects a first terminal of each of the two of the plurality of second loop electrodes to a first one of two second common terminals, and connects a second terminal of each of the two of the plurality of second loop electrodes to a second one of the two second common terminals, without connecting the plurality of second loop electrodes other than the two of the plurality of second loop electrodes to the two second common terminals, and wherein the two of the plurality of second loop electrodes change sequentially over time from a first two of the plurality of second loop electrodes to a last two of the plurality of second loop electrodes.

7. The position detection device according to claim 6 wherein:

the first selection circuitry, in operation, simultaneously selects a first one and a second one the plurality of first loop electrodes during an initial time period, the first selection circuitry, in operation, simultaneously selects the second one and a third one of the plurality of first loop electrodes during a second time period that immediately follows the initial time period, the second selection circuitry, in operation, simultaneously selects a first one and a second one the plurality of second loop electrodes during the initial time period, and the second selection circuitry, in operation, simultaneously selects the second one and a third one of the plurality of second loop electrodes during the second time period that immediately follows the initial time period.

8. The position detection device according to claim 6 wherein:

the first selection circuitry includes a first selection switch and a second selection switch, the first one of the two first common terminals is a common terminal of the first selection switch of the first selection circuitry and the second one of the two first common terminals is a common terminal of the second selection switch of the first selection circuitry, the first selection switch of the first selection circuitry, in operation, connects the first terminal of each of the two of the plurality of first loop electrodes to the common terminal of the first selection switch of the first selection circuitry, the second selection switch of the first selection circuitry, in operation, connects the second terminal of each of the two of the plurality of first loop electrodes to the common terminal of the second selection switch of the first selection circuitry, the second selection circuitry includes a first selection switch and a second selection switch, the first one of the two second common terminals is a common terminal of the first selection switch of the second selection circuitry and the second one of the two second common terminals is a common terminal of the second selection switch of the second selection circuitry, the first selection switch of the second selection circuitry, in operation, connects the first terminal of each of the two of the plurality of second loop electrodes to the common terminal of the second selection switch of the second selection circuitry, and the second selection switch of the second selection circuitry, in operation, connects the second terminal of each of the two of the plurality of second loop electrodes to the common terminal of the second selection switch the second selection circuitry.

9. The position detection device according to claim 6, further comprising:

mode switch circuitry coupled to the two first common terminals and the two second common terminals, wherein, in a first mode of operation, the two first common terminals are respectively coupled to two input terminals of a first amplifier, and the two second common terminals are respectively coupled to two input terminals of a second amplifier that is different from the first amplifier, and wherein, in a second mode of operation, the two first common terminals are coupled to an input terminals of a third amplifier that is different from the first amplifier and the second amplifier, and the two second common terminals are connected to an output terminal of a fourth amplifier that is different from the first amplifier, the second amplifier, and the third amplifier.

10. The position detection device according to claim 9 wherein the first amplifier is a first differential amplifier and the second amplifier is a second differential amplifier.

11. A position detection device comprising:

a position detection sensor having a plurality of first loop electrodes arranged in a first direction, and a plurality of second loop electrodes arranged in a second direction perpendicular to the first direction, wherein each of the first loop electrodes is elongated in the second direction, and wherein each of the second loop electrodes is elongated in the first direction; and first selection circuitry coupled to the plurality of first loop electrodes of the position detection sensor, wherein the first selection circuitry, in operation, simultaneously selects three of the plurality of first loop electrodes, connects a first terminal of each of the three of the plurality of first loop electrodes to a first one of two first common terminals, and connects a second terminal of each of the three of the plurality of second loop electrodes to a second one of the two first common terminals, without connecting the plurality of first loop electrodes other than the three of the plurality of first loop electrodes to the two first common terminals, and wherein the three of the plurality of first loop electrodes change sequentially over time from a first three of the plurality of first loop electrodes to a last three of the plurality of first loop electrodes.

12. The position detection device according to claim 11 wherein:

the first selection circuitry, in operation, simultaneously selects a first one, a second one, and a third one of the plurality of first loop electrodes during an initial time period, the first selection circuitry, in operation, simultaneously selects the second one, the third one, and a fourth one of the plurality of first loop electrodes during a second time period that immediately follows the initial time period, and the first selection circuitry, in operation, simultaneously selects the third one, a fourth one, and a fifth one of the plurality of first loop electrodes during a third time period that immediately follows the second time period.

13. The position detection device according to claim 11, wherein:

the first selection circuitry includes a first selection switch and a second selection switch, the first one of the two first common terminals is a common terminal of the first selection switch and the second one of the two first common terminals is a common terminal of the second selection switch, the first selection switch, in operation, connects the first terminal of each of the three of the plurality of first loop electrodes to the common terminal of the first selection switch, and the second selection switch, in operation, connects the second terminal of each of the three of the plurality of first loop electrodes to the common terminal of the second selection switch.

14. The position detection device according to claim 11, further comprising:

mode switch circuitry coupled to the two first common terminals, wherein, in a first mode of operation, the two first common terminals are respectively coupled to two input terminals of a first amplifier, and wherein, in a second mode of operation, the two first common terminals are coupled to an input terminals of a second amplifier that is different from the first amplifier.

15. The position detection device according to claim 14 wherein the first amplifier is a differential amplifier.

16. The position detection device according to claim 11, further comprising:

second selection circuitry coupled to the plurality of second loop electrodes of the position detection sensor, wherein the second selection circuitry, in operation, simultaneously selects three of the plurality of second loop electrodes, connects a first terminal of each of the three of the plurality of second loop electrodes to two second common terminals, and connects a second terminal of each of the three of the plurality of second loop electrodes to a second one of the two second common terminals, without connecting the plurality of second loop electrodes other than the three of the plurality of second loop electrodes to the two second common terminals, and wherein the three of the plurality of second loop electrodes change sequentially over time from a first three of the plurality of second loop electrodes to a last three of the plurality of second loop electrodes.

17. The position detection device according to claim 16 wherein:

the first selection circuitry, in operation, simultaneously selects a first one, a second one, and a third one of the plurality of first loop electrodes during an initial time period, the first selection circuitry, in operation, simultaneously selects the second one, the third one, and a fourth one of the plurality of first loop electrodes during a second time period that immediately follows the initial time period, the first selection circuitry, in operation, simultaneously selects the third one, a fourth one, and a fifth one of the plurality of first loop electrodes during a third time period that immediately follows the second time period, the second selection circuitry, in operation, simultaneously selects a first one, a second one, and a third one of the plurality of second loop electrodes during the initial time period, the second selection circuitry, in operation, simultaneously selects the second one, the third one, and a fourth one of the plurality of second loop electrodes during the second time period that immediately follows the initial time period, and the second selection circuitry, in operation, simultaneously selects the third one, a fourth one, and a fifth one of the plurality of second loop electrodes during the third time period that immediately follows the second time period.

18. The position detection device according to claim 16 wherein:

the first selection circuitry includes a first selection switch and a second selection switch, the first one of the two first common terminals is a common terminal of the first selection switch of the first selection circuitry and the second one of the two first common terminals is a common terminal of the second selection switch of the first selection circuitry, the first selection switch of the first selection circuitry, in operation, connects the first terminal of each of the three of the plurality of first loop electrodes to the common terminal of the first selection switch of the first selection circuitry, the second selection switch of the first selection circuitry, in operation, connects the second terminal of each of the three of the plurality of first loop electrodes to the common terminal of the second selection switch of the first selection circuitry, the second selection circuitry includes a first selection switch and a second selection switch, the first one of the two second common terminals is a common terminal of the first selection switch of the second selection circuitry and the second one of the two second common terminals is a common terminal of the second selection switch of the second selection circuitry, the first selection switch of the second selection circuitry, in operation, connects the first terminal of each of the three of the plurality of second loop electrodes to the common terminal of the second selection switch of the second selection circuitry, and the second selection switch of the second selection circuitry, in operation, connects the second terminal of each of the three of the plurality of second loop electrodes to the common terminal of the second selection switch the second selection circuitry.

19. The position detection device according to claim 16, further comprising:
mode switch circuitry coupled to the two first common terminals and the two second common terminals,
wherein, in a first mode of operation, the two first common terminals are respectively coupled to two input terminals of a first amplifier, and the two second common terminals are respectively coupled to two input terminals of a second amplifier that is different from the first amplifier, and
wherein, in a second mode of operation, the two first common terminals are coupled to an input terminals of a third amplifier that is different from the first amplifier and the second amplifier, and the two second common terminals are connected to an output terminal of a fourth amplifier that is different from the first amplifier, the second amplifier, and the third amplifier.

20. The position detection device according to claim 19 wherein the first amplifier is a first differential amplifier and the second amplifier is a second differential amplifier.

* * * * *